US012545938B1

(12) United States Patent
Liu et al.

(10) Patent No.: US 12,545,938 B1
(45) Date of Patent: Feb. 10, 2026

(54) METHOD FOR EFFICIENTLY PRODUCING L-HOMOPHENYLALANINE AND STRAIN PRODUCING L- HOMOPHENYLALANINE

(71) Applicant: JIANGNAN UNIVERSITY, Wuxi (CN)

(72) Inventors: Liming Liu, Wuxi (CN); Dengke Gao, Wuxi (CN); Wei Song, Wuxi (CN); Jing Wu, Wuxi (CN); Jia Liu, Wuxi (CN); Xiulai Chen, Wuxi (CN); Cong Gao, Wuxi (CN); Liang Guo, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/998,211

(22) PCT Filed: Oct. 19, 2022

(86) PCT No.: PCT/CN2022/126212
§ 371 (c)(1),
(2) Date: Nov. 8, 2022

(87) PCT Pub. No.: WO2023/245933
PCT Pub. Date: Dec. 28, 2023

(30) Foreign Application Priority Data

Jun. 23, 2022 (CN) .......................... 202210720068.1

(51) Int. Cl.
| | | |
|---|---|---|
| *C12N 9/88* | (2006.01) | |
| *C12N 9/02* | (2006.01) | |
| *C12N 9/06* | (2006.01) | |
| *C12N 15/70* | (2006.01) | |
| *C12P 13/22* | (2006.01) | |
| *C12R 1/19* | (2006.01) | |

(52) U.S. Cl.
CPC .......... *C12P 13/222* (2013.01); *C12N 9/0008* (2013.01); *C12N 9/0018* (2013.01); *C12N 9/0067* (2013.01); *C12N 9/88* (2013.01); *C12N 15/70* (2013.01); *C12R 2001/19* (2021.05); *C12Y 102/01002* (2013.01); *C12Y 112/05001* (2013.01); *C12Y 401/02013* (2013.01)

(58) Field of Classification Search
CPC ... C12P 13/222; C12N 9/0008; C12N 9/0018; C12N 9/0067; C12N 9/88; C12N 15/70; C12R 2001/19; C12Y 102/01002; C12Y 112/05001; C12Y 401/02013
See application file for complete search history.

(56) References Cited

FOREIGN PATENT DOCUMENTS

| | | |
|---|---|---|
| CN | 101054570 A | 10/2007 |
| CN | 106748844 A | 5/2017 |
| CN | 106834373 A | 6/2017 |
| CN | 112662637 A | 4/2021 |
| CN | 112662656 A | 4/2021 |
| CN | 113817697 A | 12/2021 |
| CN | 115044627 A | 9/2022 |

OTHER PUBLICATIONS

Dengke Gao et al., "Efficient Production of L-Homophenylalanine by Enzymatic-Chemical Cascade Catalysis" Angew. Chem. 2022, vol. 61, No. 36, 134, e202207077 (Sep. 5, 2022).
Jia Liu et al., "A multi-enzyme cascade reaction for the production of L-homophenylalanine" Acta Microbiologica Sinica 2021, 61(9): 2829-2842 (Jun. 11, 2021).

*Primary Examiner* — Iqbal H Chowdhury
(74) *Attorney, Agent, or Firm* — SZDC Law PC

(57) ABSTRACT

The present invention provides a method for efficiently producing L-homophenylalanine and a strain producing L-homophenylalanine. In the present invention, a new route for the synthesis of L-homophenylalanine by a cascade enzymatic method using cheap benzaldehyde and pyruvic acid as raw materials is designed. By constructing the pathway-related enzymes into the same *E. coli* strain, a recombinant *E. coli* is obtained, with which L-homophenylalanine is catalytically produced through reaction in a 5 L reactor, with a yield of 100.9 g/L, a conversion rate of 94%, and ee>99%. Compared with the existing main methods for producing L-HPA, the production cost of L-homophenylalanine is greatly reduced. Thus, the present invention has good application prospects.

6 Claims, 4 Drawing Sheets
Specification includes a Sequence Listing.

SEQUENCE LISTING

```
Sequence total quantity: 32
SEQ ID NO: 1            moltype = DNA   length = 996
FEATURE                 Location/Qualifiers
source                  1..996
                        mol_type = other DNA
                        organism = unidentified
SEQUENCE: 1
atgctgaaca aagtgattaa aaccacccgc ctgaccgcgg aagatattaa cggcgcgtgg  60
accattatgc cgaccccgag caccccggat gcgagcgatt ggcgcagcac caacaccgtg 120
gacctggatg aaaccgcgcg cattgtgaa  gaactgattg cggcgggcgt gaacggcatt 180
ctgagcatgg gcacctttgg cgaatgcgcg accctgacct gggaagaaaa acgcgattat 240
gtgagcaccg tggtggaaac cattcgcggc cgcgtgcgt  attttttgcgg caccaccgcg 300
ctgaacaccc gcgaagtgat tcgtcagacc cgcgaactga ttgatattgg cgcgaacggc 360
accatgctgg gcgtgccgat gtgggtgaaa atggacctgc cgaccgcggt gcagttttat 420
cgcgatgtgg cgggcgcggt gccggaagcg gcgattgcga tttatgcgaa cccggaagcg 480
tttaaatttg attttccgcg cccgttttgg gcggaaatga gcaaaattcc gcaagtggtg 540
accgcgaaat atctgggcat tggcatgctg gacctggacc tgaaactggc gccgaacatt 600
cgctttctgc cgcatgaaga tgattattat gcggccgcgc gcattaaccc ggaacgcatt 660
accgcgtttt ggagcagcgg cgcgatgtgc ggcccggcga ccgcgattat gctgcgcgat 720
gaagtggaac gcgcgaaaag caccggcgat tggattaaag cgaaagcgat tagcgatgat 780
atgcgcgcgg cggatagcac cctgtttccg cgcggcgatt ttagcgaatt tagcaaatat 840
aacattggcc tggaaaaagc gcgcatggat gcggcgggct ggctgaaagc gggcccgtgc 900
cgcccgccgt ataacctggt gccggaagat tatctggtgg gcgcgcagaa aagcggcaaa 960
gcgtgggcgg cgctgcatgc gaaatatagc aaataa                           996

SEQ ID NO: 2            moltype = AA    length = 331
FEATURE                 Location/Qualifiers
source                  1..331
                        mol_type = protein
                        organism = unidentified
SEQUENCE: 2
MLNKVIKTTR LTAEDINGAW TIMPTPSTPD ASDWRSTNTV DLDETARIVE ELIAAGVNGI  60
LSMGTFGECA TLTWEEKRDY VSTVVETIRG RVPYFCGTTA LNTREVIRQT RELIDIGANG 120
TMLGVPMWVK MDLPTAVQFY RDVAGAVPEA AIAIYANPEA FKFDFPRPFW AEMSKIPQVV 180
TAKYLGIGML DLDLKLAPNI RFLPHEDDYY AAARINPERI TAFWSSGAMC GPATAIMLRD 240
EVERAKSTGD WIKAKAISDD MRAADSTLFP RGDFSEFSKY NIGLEKARMD AAGWLKAGPC 300
RPPYNLVPED YLVGAQKSGK AWAALHAKYS K                                 331

SEQ ID NO: 3            moltype = DNA   length = 984
FEATURE                 Location/Qualifiers
source                  1..984
                        mol_type = other DNA
                        organism = unidentified
SEQUENCE: 3
```

```
atggcaacac gaattgaatt tcacaagcac ggtggcccgg aagtacttca agccgtagag   60
ttcactcctg ccgatccggc ggagaatgaa atccaggtcg aaaataaagc catcggcatc  120
aatttatcg acacatatat ccgcagcggc ctttacccgc cgccatcgct acccagcgga  180
ttaggcaccg aagcagcagg catcgtgagt aaagtcggca gtggtgtaaa gcatattaag  240
gcaggcgatc gtgtagtcta tgcgcagtcg gcgttaggca cttacagctc tgtgcataac  300
attattgcgg ataaagcggc gattctgcct gcggcaattt cttttgagca agctgcggca  360
tccttcctga aaggcttaac ggtttattat ctgctgcgca aaacctatga aattaaaccc  420
gatgagcagt tcctgttcca cgcagcagct ggcggcgttg gcttgattgc ctgccagtgg  480
gcaaaagccc tgggcgcgaa acttatcggc accgtaggaa ccgcgcaaaa agcgcagagc  540
gcgctaaaag cgggcgcgtg gcaggttatt aactatcgtg aagagaatct ggtcgagcgg  600
ttaaaagaga tcaccggcgg taagaaagtg cgcgtggtgt acgattccgt gggcagagac  660
acctgggaac ggtcgctgga ttgcctgcaa cgccgcggct aatggtgagt tttggcaac   720
tcatcaggtg cggttaccgg tgtgaactta ggcattctca atcagaaagg ctcgttgtat  780
gtgacacgcc cttccctgca aggctatatc accacgcggg aggaattaac cgaggccagt  840
aatgaactgt tctctttgat tgccagcggt gtgattaagg tcgatgtcgc cgagcagcag  900
aaatatccgc tgaaggatgc gcagcgtgcg catgaaattc tggaaagccg ggcaacgcaa  960
ggttccagcc tgctgattcc ataa                                         984

SEQ ID NO: 4            moltype = AA   length = 327
FEATURE                 Location/Qualifiers
source                  1..327
                        mol_type = protein
                        organism = unidentified
SEQUENCE: 4
MATRIEFHKH GGPEVLQAVE FTPADPAENE IQVENKAIGI NFIDTYIRSG LYPPPSLPSG   60
LGTEAAGIVS KVGSGVKHIK AGDRVVYAQS ALGAYSSVHN IIADKAAILP AAISFEQAAA  120
SFLKGLTVYY LLRKTYEIKP DEQFLFHAAA GGVGLIACQW AKALGAKLIG TVGTAQKAQS  180
ALKAGAWQVI NYREENLVER LKEITGGKKV RVVYDSVGRD TWERSLDCLQ RRGLMVSFGN  240
SSGAVTGVNL GILNQKGSLY VTRPSLQGYI TTREELTEAS NELFSLIASG VIKVDVAEQQ  300
KYPLKDAQRA HEILESRATQ GSSLLIP                                      327

SEQ ID NO: 5            moltype = DNA   length = 1101
FEATURE                 Location/Qualifiers
source                  1..1101
                        mol_type = other DNA
                        organism = unidentified
SEQUENCE: 5
atgcgcgacg tgtttgaaat gatggaccgc tatggccacg agcaggtcat tttttgccgt   60
catccgcaaa ccggtctcaa agccgatcat gccttgcata atacaaccgc ggggcgggct  120
ttgggtggat gccgcatgat cccgtatgct cgacggacg aagccttgga ggatgtttg   180
cggttgtcca aaggcatgac ctataaatgc agtctggcgg atgtggactt ggcgggga    240
aaaatggtta tcatcggcga tccgaaaaaa gataaatcgc cggagttgtt tcgcgtgatc  300
ggccgttttg tgggcgggtt aaacggccgt ttctataccg gaaccgacat gggaaccaat  360
ccggaagatt ttgtccatgc cgccaggaa tcgaaatctt ttgccggatt gccgaaatcg  420
tacggcggaa aggggacac atccattccc accgcgctcg ggtgtgttca cggaatgcgg  480
gccaccgccc ggttttatg ggggacggat cagctgaaag gcgtgtggt tgccatccaa   540
ggagtcggaa aggtgggaga gcgcttgttg cagctttttg tcgaagtggg ggcttactgc  600
aaaattgccg acatcgattc ggtgcgatgc gaacagctga agaaaaagta tggcgacaag  660
gtccaattgg tggatgtgaa ccggattcac aaggagagtt gcgatatttt ctcgccttgc  720
gccaaaggcg gcgtggtcaa tgatgacacc attgacgagt tccgttgcct ggccattgtc  780
ggatccgcca caaccaact ggtggaagac cggcatgggg cactgcttca aaaacggacc  840
atttgcttatg cacccgatta tctggtgaat gccggcgggc tgattcaagt ggctgatgaa  900
ctggaaggct tccatgaaga gagagtgctc gccaaaccgg aagcgattta tgacatggtc  960
ctggatattt tcaccggggc gaaaaatgag aatattccca cttgtgaggc agcggaccgg 1020
atcgtgatgg agcgtttgaa aaagttaacc gatattcgcc ggatcttgtt ggaggatccc 1080
cgcaacagcg caaggaggta a                                           1101

SEQ ID NO: 6            moltype = AA   length = 366
FEATURE                 Location/Qualifiers
source                  1..366
                        mol_type = protein
                        organism = unidentified
SEQUENCE: 6
MRDVFEMMDR YGHEQVIFCR HPQTGLKAII ALHNTTAGPA LGGCRMIPYA STDEALEDVL   60
RLSKGMTYKC SLADVDFGGG KMVIIGDPKK DKSPELFRVI GRFVGGLNGR FYTGTDMGTN  120
PEDFVHAARE SKSFAGLPKS YGGKGDTSIP TALGVFHGMR ATARFLWGTD QLKGRVVAIQ  180
GVGKVGERLL QLLVEVGAYC KIADIDSVRC EQLKEKYGDK VQLVDVNRIH KESCDIFSPC  240
AKGGVVNDDT IDEFRCLAIV GSANNQLVED RHGALLQKRS ICYAPDYLVN AGGLIQVADE  300
LEGFHEERVL AKTEAIYDMV LDIFHRAKNE NITTCEAADR IVMERLKKLT DIRRILLEDP  360
RNSARR                                                            366

SEQ ID NO: 7            moltype = DNA   length = 1095
FEATURE                 Location/Qualifiers
source                  1..1095
                        mol_type = other DNA
                        organism = unidentified
SEQUENCE: 7
atgaagattg tcttagttct ttatgatgct ggtaagcacg ctgctgatga agaaaaatta   60
tatggttgta ctgaaaataa attaggtatt gctaattggt taaagatca aggtcatgaa  120
```

```
ctaattacta cttctgataa agaaggtgaa acaagtgaat tggataaaca tatcccagat    180
gctgatatta tcatcaccac tcctttccat cctgcttata tcactaagga aagacttgac    240
aaggctaaga acttaaaatt agtcgttgtc gctggtgttg ttctgatca cattgattta    300
gattatatta atcaaacagg taagaaaatc tcagtcctgg aagttacagg ttctaatgtt    360
gtctctgttg ctgaacacgt tgtcatgacc atgcttagaa tttcgttcca                420
gcacatgaac aaattattaa ccacgattgg gaggttgctg ctatcgctaa ggatgcttac    480
gatatcgaag gtaaaactat cgctaccatt ggtgctggta gaattggtta cagagtcttg    540
gaaagattac tcccatttaa tccaaaagaa ttattatact acgattatca agctttacca    600
aaagaagctg aagaaaaagt tggtgctaga agagttgaaa atattgaaga attagttgct    660
caagctgata tcgttacagt taatgctcca ttacacgcag gtacaaaagg tttaattaat    720
aaggaattat tatctaaatt taaaaaaggt gcttggttag tcaataccgc aagaggtgct    780
atttgtgttg ctgaagatgt tgcagcagct ttagaatctg gtcaattaag aggttacggt    840
ggtgatgttt ggttcccaca accagctcca aaggatcacc catggagaga tatgagaaat    900
aaatatggtg ctggtaatgc catgactcct cactactttg gtactacttt agacgctcaa    960
acaagatacg ctgaaggtac taaaaatatt ttggaatcat tctttaccgg taaatttgat   1020
tacagaccac aagatattat cttattaaat ggtgaatacg ttactaaagc ttacggtaaa   1080
cacgataaga aataa                                                     1095

SEQ ID NO: 8           moltype = AA  length = 364
FEATURE                Location/Qualifiers
source                 1..364
                       mol_type = protein
                       organism = unidentified
SEQUENCE: 8
MKIVLVLYDA GKHAADEEKL YGCTENKLGI ANWLKDQGHE LITTSDKEGE TSELDKHIPD     60
ADIIITTPFH PAYITKERLD KAKNLKLVVV AGVGSDHIDL DYINQTGKKI SVLEVTGSNV    120
VSVAEHVVMT MLVLVRNFVP AHEQIINHDW EVAAIAKDAY DIEGKTIATI GAGRIGYRVL    180
ERLLPFNPKE LLYYDYQALP KEAEEKVGAR RVENIEELVA QADIVTVNAP LHAGTKGLIN    240
KELLSKFKKG AWLVNTARGA ICVAEDVAAA LESGQLRGYG GDVWFPQPAP KDHPWRDMRN    300
KYGAGNAMTP HYSGTTLDAQ TRYAEGTKNI LESFFTGKFD YRPQDIILLN GEYVTKAYGK    360
HDKK                                                                 364

SEQ ID NO: 9           moltype = DNA  length = 1080
FEATURE                Location/Qualifiers
source                 1..1080
                       mol_type = other DNA
                       organism = unidentified
SEQUENCE: 9
atgcgcgacg tgtttgaaat gatggaccgc tatggccacg agcaggtcat tttttgccgt     60
catccgcaaa ccggtctcaa agcgatcatc gccttgcata taacaaccgc ggggccggct    120
ttgggtggat gccgcatgat cccgtatgct tcgacgacg aagccttgga ggatgtttg     180
cggttgtcca aggcatgac ctataaagct agtctggcgg atgtggactt tggcggggga    240
aaaatggtta tcatcggcga tccgaaaaaa gataaatgc ggagttgtt tcgcgtgatc     300
ggccgttttg tgggcgggtt aaacggccgt ttctataccg gaagagacat gggaaccaat    360
ccggaagatt ttgtccatgc cgccaggaa tcgaaatctt tgccggatt gccgaaatcg    420
tacggcggaa aggggacac atccattccc accgcgctcg gggtgttca cggaatgcgg    480
gccaccgccc ggttttatg ggggacggat cagctgaaag cgggtgtgt tgccatccaa    540
ggagtcggca aggtgggaga gcgcttgttg cagctttgg tcgaagtggg ggcttactgc    600
aaaattgccg acatcgattc ggtcgcatgc gaacagctga agaaaagta tggcgacaag    660
gtccaattgg tggatgtgaa ccggattcac aaggagagtt gcgatatttt ctcgccttgc    720
gccaaaggcg gcgtgggtca tgatgacacc attgacgagt tccgtgccct gccattgtc    780
ggatccgcca caaccaact ggtggaagac cggcatgggg cactgcttca aaaacggagc    840
attctgtatg caccgatta tctggtgaat gccggcgggc tgattcaagt ggctgatgaa    900
ctggaaggct tccatgaaga gagagtgctc gccaaaccg aagcgattta tgacatggtc    960
ctggatatt ttcaccgggc gaaaaatgag aatattacca cttgtgaggc agcggaccgg   1020
atcgtgatgg agcgtttgaa aaagttaacc gatattcgcc ggatcttgtt ggaggatccc   1080

SEQ ID NO: 10          moltype = AA  length = 360
FEATURE                Location/Qualifiers
source                 1..360
                       mol_type = protein
                       organism = unidentified
SEQUENCE: 10
MRDVFEMMDR YGHEQVIFCR HPQTGLKAII ALHNTTAGPA LGGCRMIPYA STDEALEDVL     60
RLSKGMTYKA SLADVDFGGG KMVIIGDPKK DKSPELFRVI GRFVGGLNGR FYTGEDMGTN    120
PEDFVHAARE SKSFAGLPKS YGGKGDTSIP TALGVFHGMR ATARFLWGTD QLKGRVVAIQ    180
GVGKVGERLL QLLVEVGAYC KIADIDSVRC EQLKEKYGDK VQLVDVNRIH KESCDIFSPC    240
AKGGVVNDDT IDEFRALAIV GSANNQLVED RHGALLQKRS ILYAPDYLVN AGGLIQVADE    300
LEGFHEERVL AKTEAIYDMV LDIFHRAKNE NITTCEAADR IVMERLKKLT DIRRILLEDP    360

SEQ ID NO: 11          moltype = DNA  length = 32
FEATURE                Location/Qualifiers
source                 1..32
                       mol_type = other DNA
                       organism = unidentified
SEQUENCE: 11
ggaattccat atggcaacac gaattgaatt tc                                   32

SEQ ID NO: 12          moltype = DNA  length = 29
```

```
FEATURE                    Location/Qualifiers
source                     1..29
                           mol_type = other DNA
                           organism = unidentified
SEQUENCE: 12
ccgctcgagt tatggaatca gcaggctgg                                      29

SEQ ID NO: 13              moltype = DNA   length = 35
FEATURE                    Location/Qualifiers
source                     1..35
                           mol_type = other DNA
                           organism = unidentified
SEQUENCE: 13
ggaattccat atgaagattg tcttagttct ttatg                               35

SEQ ID NO: 14              moltype = DNA   length = 31
FEATURE                    Location/Qualifiers
source                     1..31
                           mol_type = other DNA
                           organism = unidentified
SEQUENCE: 14
ccgctcgagt tatttcttat cgtgtttacc g                                   31

SEQ ID NO: 15              moltype = DNA   length = 34
FEATURE                    Location/Qualifiers
source                     1..34
                           mol_type = other DNA
                           organism = unidentified
SEQUENCE: 15
cggaattcga tgcgcgacgt gtttgaaatg atgg                                34

SEQ ID NO: 16              moltype = DNA   length = 32
FEATURE                    Location/Qualifiers
source                     1..32
                           mol_type = other DNA
                           organism = unidentified
SEQUENCE: 16
cccaagcttt tacctccttg cgctgttgcg gg                                  32

SEQ ID NO: 17              moltype = DNA   length = 33
FEATURE                    Location/Qualifiers
source                     1..33
                           mol_type = other DNA
                           organism = unidentified
SEQUENCE: 17
cggaattcga tgctgaacaa agtgattaaa acc                                 33

SEQ ID NO: 18              moltype = DNA   length = 31
FEATURE                    Location/Qualifiers
source                     1..31
                           mol_type = other DNA
                           organism = unidentified
SEQUENCE: 18
cccaagcttt tatttgctat atttcgcatg c                                   31

SEQ ID NO: 19              moltype = DNA   length = 22
FEATURE                    Location/Qualifiers
source                     1..22
                           mol_type = other DNA
                           organism = unidentified
SEQUENCE: 19
catgaccta t aaanbtagtc tg                                            22

SEQ ID NO: 20              moltype = DNA   length = 22
FEATURE                    Location/Qualifiers
source                     1..22
                           mol_type = other DNA
                           organism = unidentified
SEQUENCE: 20
cagactavnt ttataggtca tg                                             22

SEQ ID NO: 21              moltype = DNA   length = 20
FEATURE                    Location/Qualifiers
source                     1..20
                           mol_type = other DNA
                           organism = unidentified
SEQUENCE: 21
tctataccgg agnngacatg                                                20
```

```
SEQ ID NO: 22               moltype = DNA    length = 20
FEATURE                     Location/Qualifiers
source                      1..20
                            mol_type = other DNA
                            organism = unidentified
SEQUENCE: 22
catgtcnnct ccggtataga                                                       20

SEQ ID NO: 23               moltype = DNA    length = 23
FEATURE                     Location/Qualifiers
source                      1..23
                            mol_type = other DNA
                            organism = unidentified
SEQUENCE: 23
attgacgagt tccgtgccct ggc                                                   23

SEQ ID NO: 24               moltype = DNA    length = 23
FEATURE                     Location/Qualifiers
source                      1..23
                            mol_type = other DNA
                            organism = unidentified
SEQUENCE: 24
gccagggcac ggaactcgtc aat                                                   23

SEQ ID NO: 25               moltype = DNA    length = 23
FEATURE                     Location/Qualifiers
source                      1..23
                            mol_type = other DNA
                            organism = unidentified
SEQUENCE: 25
attgacgagt tccgtgtcct ggc                                                   23

SEQ ID NO: 26               moltype = DNA    length = 23
FEATURE                     Location/Qualifiers
source                      1..23
                            mol_type = other DNA
                            organism = unidentified
SEQUENCE: 26
gccaggacac ggaactcgtc aat                                                   23

SEQ ID NO: 27               moltype = DNA    length = 23
FEATURE                     Location/Qualifiers
source                      1..23
                            mol_type = other DNA
                            organism = unidentified
SEQUENCE: 27
caaaaacgga gcattctgta tgc                                                   23

SEQ ID NO: 28               moltype = DNA    length = 23
FEATURE                     Location/Qualifiers
source                      1..23
                            mol_type = other DNA
                            organism = unidentified
SEQUENCE: 28
gcatacagaa tgctccgttt ttg                                                   23

SEQ ID NO: 29               moltype = DNA    length = 23
FEATURE                     Location/Qualifiers
source                      1..23
                            mol_type = other DNA
                            organism = unidentified
SEQUENCE: 29
caaaaacgga gcattgtgta tgc                                                   23

SEQ ID NO: 30               moltype = DNA    length = 23
FEATURE                     Location/Qualifiers
source                      1..23
                            mol_type = other DNA
                            organism = unidentified
SEQUENCE: 30
gcatacacaa tgctccgttt ttg                                                   23

SEQ ID NO: 31               moltype = DNA    length = 39
FEATURE                     Location/Qualifiers
source                      1..39
                            mol_type = other DNA
                            organism = unidentified
SEQUENCE: 31
ggatcttgtt ggaggatccc ctcgagcacc accaccacc                                  39
```

```
SEQ ID NO: 32          moltype = DNA  length = 39
FEATURE                Location/Qualifiers
source                 1..39
                       mol_type = other DNA
                       organism = unidentified
SEQUENCE: 32
ggtggtggtg gtgctcgagg ggatcctcca acaagatcc                              39
```

METHOD FOR EFFICIENTLY PRODUCING L-HOMOPHENYLALANINE AND STRAIN PRODUCING L- HOMOPHENYLALANINE

This application is the National Stage Application of PCT/CN2022/126212, filed on Oct. 19, 2022, which claims priority to Chinese Patent Application No. 202210720068.1, filed on Jun. 23, 2022, which is incorporated by reference for all purposes as if fully set forth herein.

A Sequence Listing XML file named "20221108_10015_0106_Sequence Listing.xml" created on Nov. 8, 2022, and having a size of 35,198 bytes, is filed concurrently with the specification. The sequence listing contained in the XML file is part of the specification and is herein incorporated by reference in its entirety.

FIELD OF THE INVENTION

The present invention relates to the technical field of bioengineering, and specifically to a method for efficiently producing L-homophenylalanine and a strain producing L-homophenylalanine.

DESCRIPTION OF THE RELATED ART

L-homophenylalanine (L-HPA) is a main material in the synthesis of angiotensin-converting enzyme inhibitors. Currently, L-HPA is a common intermediate for about 20 new drugs for the treatment of hypertension in the world, including enalapril, benazepril, cilazapril, imidapril, and quinapril, etc. Further, L-HPA is also a protease inhibitor, an acetylcholinesterase inhibitor, and an important component in chiral drugs such as neutral endopeptidase inhibitors and β-lactam antibiotics.

At present, chemical synthesis is a main method for the production of L-HPA, in which N-phthaloyl-L-aspartic anhydride is used as a raw material, and subjected to Friedel-Crafts reaction, hydrogenation reduction, deprotection and other processes to synthesize L-HPA. However, this method has low yield, large energy consumption, and toxic adverse effects on the environment, thus not meeting the requirements of green production, safe production and sustainable development. The preparation of L-HPA by biological enzymatic method has the advantages of stable and safe product quality, mild process conditions, high efficiency, and environmental protection, to reduce the pressure on the environment and resources. Therefore, there is an urgent need for an effective biological method to efficiently produce L-HPA.

At present, the main methods for bioenzymatic production of L-HPA include: (1) Dehydrogenase method: L-HPA is synthesized by Yao Nie et al. by heterologously expressing a phenylalanine dehydrogenase mutant and glucose dehydrogenase in *E. coli*, using 2-oxo-4-phenylbutyric acid (OPBA) as a substrate and free ammonium ions as an amino donor. Through a fed-batch scheme, 1.08 M OPBA is converted into L-HPA after four fed-batches, with a conversion rate of 90.2%. Glutamate dehydrogenase is modified by Lirong Yang et al. by semi-rational design, whereby the I406F mutant has a specific activity for the substrate OPBA that is increased by30.1 times. When the fed amount of the substrate is 17.5 g/L, the yield reaches 17.13 g/L, with a conversion rate of 99%. (2) Transaminase method: L-HPA is produced by Byung-Kwan Cho et al. using an aromatic amino acid transaminase (AroAT) and using OPBA as a substrate and L-aspartic acid as an amino donor, with a conversion rate of >97%. (3) Hydantoinase method: L-HPA is produced by Wen-Hwei Hsu et al. by obtaining L-HPAH from a mixture of D- and L-phenethyl hydantoin in the presence of a hydantoin racemase, then obtaining carbamoyl-L-homophenylalanine in the presence of a hydantoinase, and finally hydrolyzing by carbamoyl hydrolase, with a conversion rate of 49%.

Although certain outcomes have been achieved with the existing biosynthesis pathways of L-HPA, the substrates used, including OPBA and phenyl hydantoin are expensive and not readily available, and more expensive than L-HPA, thus being not suitable for industrial production. To achieve the synthesis of L-HPA with inexpensive starting materials, a method for producing L-HPA is developed in the previous research work, where cheap glycine and phenylacetaldehyde are used as raw materials, and an engineered *Escherichia coli* strain co-expressing threonine aldolase, threonine deaminase, phenylalanine dehydrogenase, and formate dehydrogenase is used. However, the yield is only 1.226 g/L, and the conversion rate is only 34.2%, which limit the industrial application. Therefore, other synthesis routes to synthesize L-HPA with cheap raw materials are developed to realize the industrial production of L-HPA.

SUMMARY OF THE INVENTION

To solve the above technical problems, In the present invention, a new route for the synthesis of L-homophenylalanine by a cascade enzymatic method using cheap benzaldehyde and pyruvic acid as raw materials is designed. In the route, (E)2-oxo-4-phenyl-3-butenoic acid is produced through an aldol condensation reaction catalyzed by an aldolase, then 2-oxo-4-phenylbutyric acid is produced by the reduction of C=C double bond catalyzed by a quinone oxidoreductase, and finally L-homophenylalanine is produced by the reductive amination catalyzed by a phenylalanine dehydrogenase. During the process, NADH is regenerated by using a formate dehydrogenase.

A first object of the present invention is to provide a method for efficiently producing L-homophenylalanine. The method aims to catalytically produce L-homophenylalanine with benzaldehyde and pyruvic acid as substrates, through cascade enzymatic reactions using an aldolase (PpNahE), a quinone oxidoreductase (EcQOR), a phenylalanine dehydrogenase (TiPheDH) and a formate dehydrogenase (CbFDH).

In the present invention, (E)2-oxo-4-phenyl-3-butenoic acid is produced through an aldol condensation reaction catalyzed by an aldolase, then 2-oxo-4-phenylbutyric acid is produced by the reduction of C=C double bond catalyzed by a quinone oxidoreductase, and finally L-homophenylalanine is produced by the reductive amination catalyzed by a phenylalanine dehydrogenase. During the process, NADH is regenerated by using a formate dehydrogenase.

Preferably, the aldolase (PpNahE) has an amino acid sequence as shown in SEQ ID NO. 2; the quinone oxidoreductase (EcQOR) has an amino acid sequence as shown in SEQ ID NO.4; the phenylalanine dehydrogenase (TiPheDH) has an amino acid sequence as shown in SEQ ID NO.6 or SEQ ID NO.10; and the formate dehydrogenase (CbFDH) has an amino acid sequence as shown in SEQ ID NO.8.

In the present invention, the phenylalanine dehydrogenase is further mutated, to obtain a phenylalanine dehydrogenase mutant having an amino acid sequence as shown in SEQ ID NO. 1, with which the conversion rate to L-homophenylalanine is higher.

Preferably, the aldolase, the quinone oxidoreductase, the phenylalanine dehydrogenase and the formate dehydrogenase are co-expressed in the same host strain or separately expressed in different host strains.

A second object of the present invention is to provide a genetically engineered strain producing L-homophenylalanine. The genetically engineered strain co-expresses an aldolase (PpNahE), a quinone oxidoreductase (EcQOR), a phenylalanine dehydrogenase (TiPheDH) and a formate dehydrogenase (CbFDH).

Preferably, the aldolase has an amino acid sequence as shown in SEQ ID NO. 2; the quinone oxidoreductase has an amino acid sequence as shown in SEQ ID NO.4; the phenylalanine dehydrogenase has an amino acid sequence as shown in SEQ ID NO.6 or SEQ ID NO.10; and the formate dehydrogenase has an amino acid sequence as shown in SEQ ID NO.8.

Preferably, the genetically engineered strain is produced with E. coli as a host.

Preferably, the E. coli is Escherichia coli BL21 (DE3).

Preferably, the aldolase and the quinone oxidoreductase are expressed with pCDFDuet-1 as a vector, and the phenylalanine dehydrogenase and the formate dehydrogenase are expressed with pRSFDuet-1 as a vector.

A third object of the present invention is to provide use of the genetically engineered strain in the production of L-homophenylalanine.

Preferably, the use comprises catalytically synthesizing L-homophenylalanine with benzaldehyde and pyruvic acid using the genetically engineered strain as a catalyst, where the amount of the genetically engineered strain is 20-30 g/L; the content of the coenzyme NAD$^+$ is 0.1-0.3 mM; the pH of the reaction system is 7.5-8.5; the reaction temperature is 28-32° C., during the reaction, the substrates benzaldehyde and pyruvic acid are fed in batches, and the substrates are fed in an amount of 40-60 mM benzaldehyde and 40-60 mM pyruvic acid in each batch; and during the reaction, ammonium formate is also fed in batches, in an amount of 90-130 mM in each batch.

Beneficial Effects of the Present Invention

In the present invention, a new route for the synthesis of L-homophenylalanine by a cascade enzymatic method using cheap benzaldehyde and pyruvic acid as raw materials is designed. By constructing the pathway-related enzymes into the same E. coli strain, a recombinant E. coli is obtained, with which L-homophenylalanine is catalytically produced through reaction in a 5 L reactor, with a yield of 100.9 g/L, a conversion rate of 94%, and ee>99%. Compared with the existing main methods for producing L-HPA, the production cost of L-homophenylalanine is greatly reduced. Thus, the present invention has good application prospects.

DETAILED DESCRIPTION OF THE PREFERRED EMBODIMENTS

The present invention will be further described below in connection with specific examples, so that those skilled in the art can better understand and implement the present invention; however, the present invention is not limited thereto.

Example 1: Cascade Pathway of L-Homophenylalanine

Figure 1:
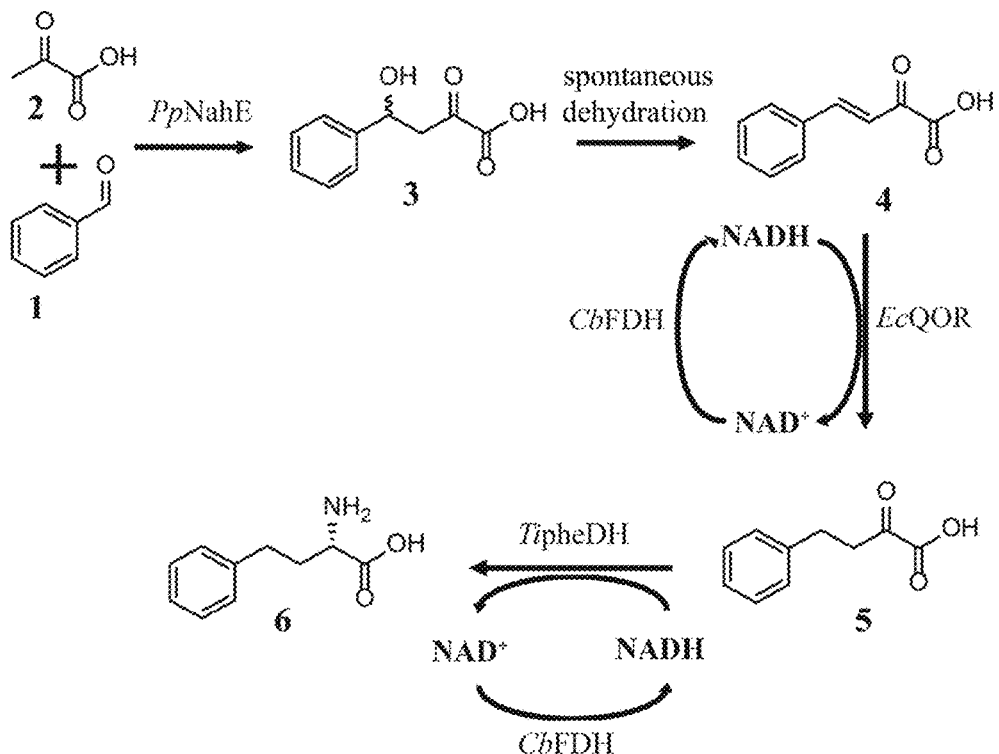
FIG. 1 shows the synthesis route of L-homophenylalanine.

As shown in FIG. 1, in a first step, benzaldehyde (1) and pyruvic acid (2) used as raw materials were converted into 4-hydroxy-2-oxo-4-phenylbutyric acid (3) by an aldolase (PpNahE), and then (3) underwent spontaneous dehydration to form (E)-2-oxo-4-phenyl-3-butenoic acid (4). In a second step, using NAD$^+$ as a coenzyme, Compound (4) was converted into the compound 2-oxo-4-phenylbutyric acid (5) by a quinone oxidoreductase (EcQOR). In a third step, using NAD$^+$ as a coenzyme and free ammonium ions as a donor, Compound (5) was converted into the compound L-homophenylalanine (6) by a phenylalanine dehydrogenase (TiPheDH). During the process, since both EcQOR and TiPheDH need to consume the coenzyme, a formate dehydrogenase(CbFDH) was used to regenerate NADH by consuming sodium formate.

Example 2: Construction, Expression, and Product Identification of Engineered Strain PpNahE-pET28a-BL21 (DE3)

A target protein sequence (as shown in SEQ ID NO. 1) in Pseudomonas putida was synthesized by GENEWIZ, Inc., subjected to codon optimization and then ligated to the vector pET28a enzymatically cleaved with NdeI and XhoI. A recombinant expression plasmid PpNahE-pET-28a was obtained. The recombinant expression plasmid PpNahE-pET-28a was transformed into E. coli BL21 (DE3), to obtain a positive recombinant strain, which was designated as PpNahE-pET28a-BL21 (DE3).

The strain PpNahE-pET28a-BL21 (DE3) was transferred to 5 mL of LB liquid medium (tryptone 10 g/L, yeast powder 5 g/L, and sodium chloride 10 g/L) and incubated overnight at 37° C. Subsequently, the strain was transferred to 200 mL of TB liquid medium (tryptone 12 g/L, yeast extract 24 g/L, glycerol 4 mL/L, KH$_2$PO$_4$ 2.31 g/L and K$_2$HPO$_4$ 12.31 g/L), and incubated at 200 rpm and a constant temperature of 37° C. When the OD value reached 0.6-0.8, IPTG at a final concentration of 0.5 mM was added, for induction culture at 16° C. for 18 hrs. After centrifugation, the cells were collected.

Subsequently, 5 mL of a catalytic reaction system containing 50 mM sodium phosphate buffer solution (pH 8.0), 20 g/L wet cells, benzaldehyde (1) and pyruvic acid (2) of 50 mM each, was reacted at 30° C. A sample was taken and filtered through a 0.22 mol filter membrane.

Figure 2:
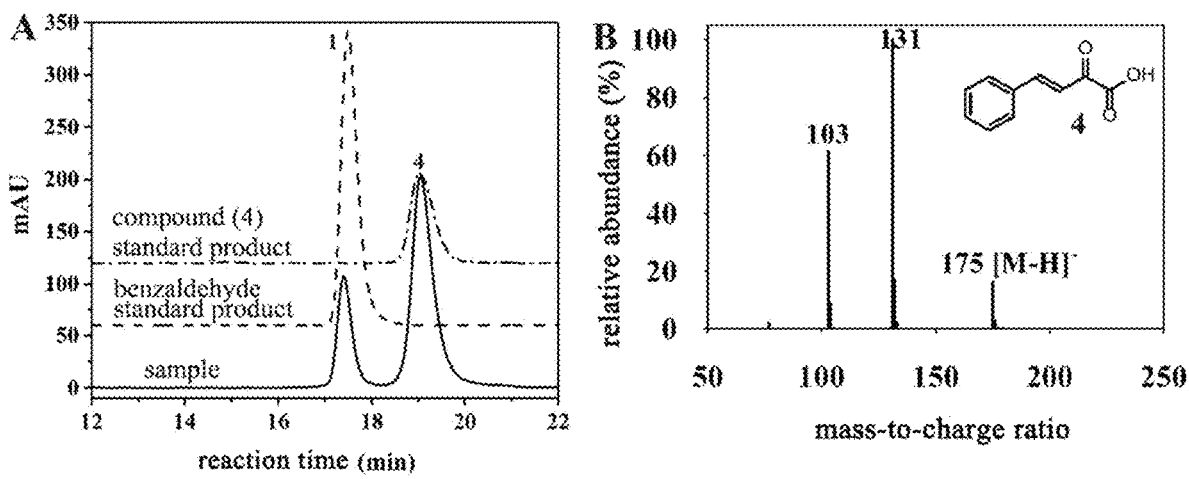
FIG. 2 shows the identification by HPLC (A) and MS (B) of the product in enzymatic conversion of benzaldehyde and pyruvic acid to synthesize 2-oxo-4-phenyl-3-butenoic acid.

The substrate consumption and product formation were detected by the Agilent 1260 HPLC system with an UV detector at 210 nm. Mobile phase A is an aqueous solution containing 0.1% TFA, mobile phase B was an acetonitrile solution containing 0.1% TFA, the column was ZORBAX SB-C18 (4.6×150 mm, 5 m), the flow rate was 1 mL, and the column temperature was 25° C. The procedure run with 75% A and 25% B for 25 min. As shown in A in FIG. 2, Compound (4) obtained by enzymatic reaction has consistent peak time with the standard product. The sample was then analyzed by anion mass spectrometry. As shown in B in FIG. 2, the formation of the product was further confirmed.

Example 3: Construction, Expression, and Product Identification of Engineered Strain EcQOR-pET28a-BL21(DE3)

Taking the nucleotide sequence (as shown in SEQ ID NO.3) of a target protein coding gene in the genome of *E. coli*. 1655 as a template and using F1 and R1 as primers (underlined are NdeI and XhoI restriction sites, respectively), PCR amplification was carried out. Amplification procedure: 30 s at 98° C., 30 cycles (10 s at 98° C., 15 s at 55° C., and 10 s at 72° C.), and 10 min at 72° C.
F1: GGAATTCCATATGGCAACACGAATTGAATTTC (SEQ ID NO.11);
R1: CCGCTCGAGTTATGGAATCAGCAGGCTGG (SEQ ID NO.12).

A cDNA sequence of the EcQOR gene coding region was obtained. After the PCR product was collected, it was enzymatically cleaved and ligated to the pET-28a plasmid vector that had been enzymatically cleaved with the same two restriction enzymes, to obtain a recombinant expression plasmid. The recombinant plasmid was transformed into *E. coli* BL21(DE3). The obtained positive engineered strain was identified by PCR, and designated as EcQOR-pET28a-BL21(DE3).

The cells were obtained following the expression conditions in Example 2. Subsequently, 5 mL of a catalytic reaction system containing 50 mM sodium phosphate buffer solution (pH 8.0), 20 g/L wet cells, 20 mM Compound (4), and 30 mM NADH was reacted at 30° C. A sample was taken and filtered through a 0.22 mol filter membrane.

Figure 3:
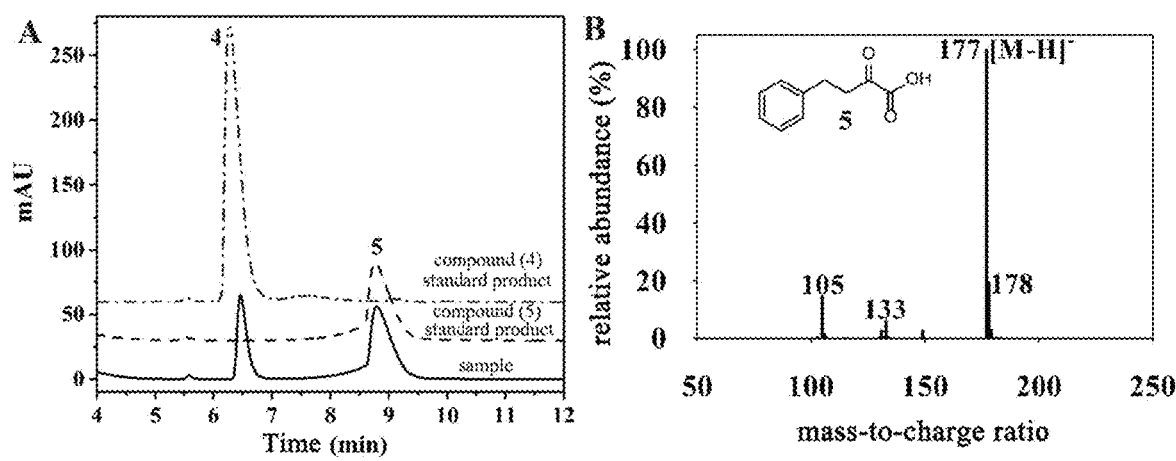
FIG. 3 shows the identification by HPLC (A) and MS (B) of the product in enzymatic conversion of 2-oxo-4-phenyl-3-butenoic acid to synthesize 2-oxo-4-phenylbutyric acid.

The substrate consumption and product formation were detected by the Agilent 1260 HPLC system with an UV detector at 210 nm. The column was ZORBAX SB-C18 (4.6×150 mm, 5 m), the flow rate was 1 mL/min, the column temperature was 25° C., mobile phase A was pure acetonitrile, and mobile phase B was 50 mM diammonium hydrogen phosphate. The procedure run with 16% A and 84% B for 15 min. As shown in A in FIG. 3, after the biocatalytic reaction, the same peak as that of the standard appears, indicating the production of Compound (5). Anion mass spectrometry, as shown in B in FIG. 3, further proves the formation of product (5).

Example 4: Construction, Expression, and Product Identification of Engineered Strain TiPheDH-pET22b-BL21 (DE3)

A target protein sequence (as shown in SEQ ID NO. 5) in *Thermoactinomyces intermedius* was synthesized by GENEWIZ, Inc., and ligated to the vector pET22b enzymatically cleaved with NdeI and XhoI. A recombinant expression plasmid TiPheDH-pET-22b was obtained. The recombinant expression plasmid TiPheDH-pET-22b was transformed into *E. coli* BL21(DE3), to obtain a positive engineered strain, which was designated as TiPheDH-pET22b-BL21(DE3).

Figure 4:
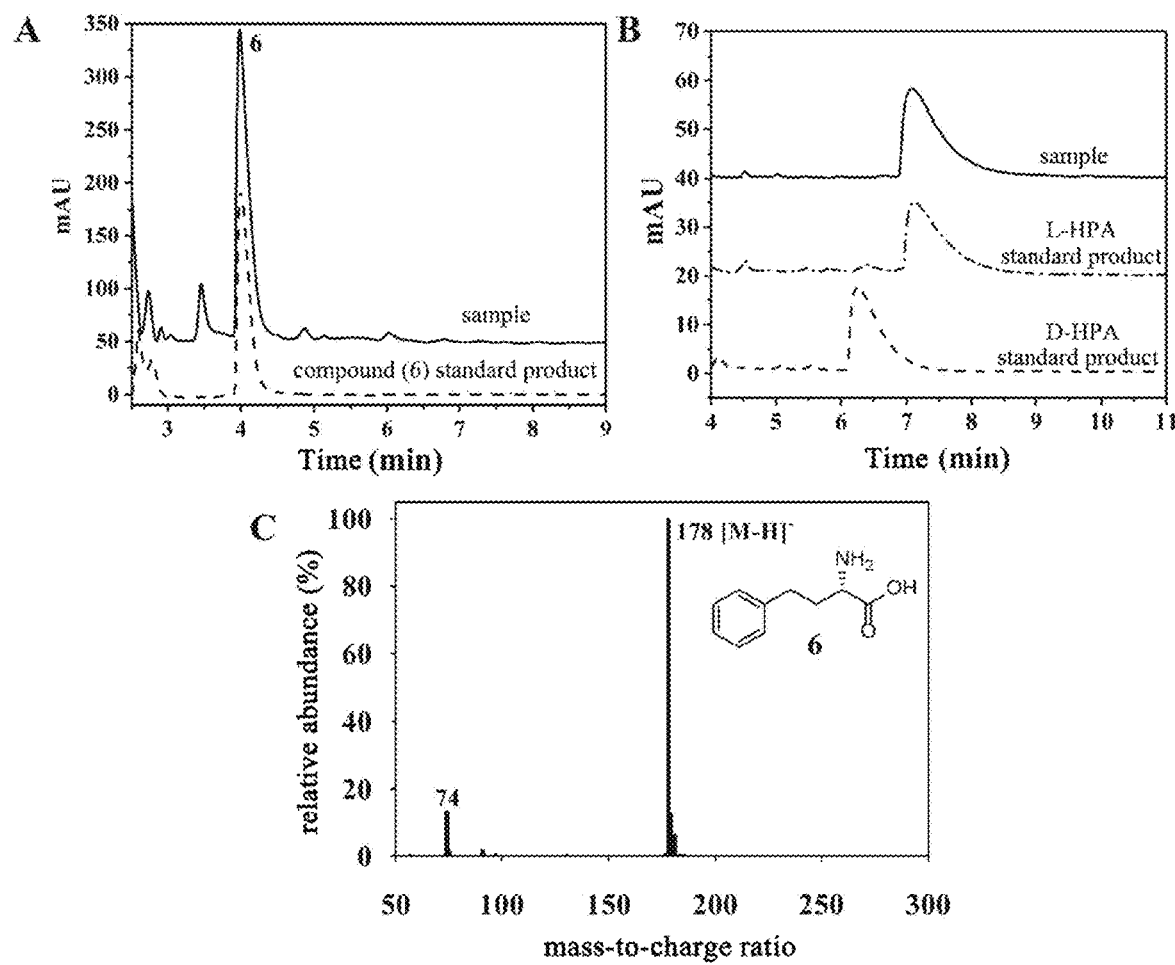
FIG. 4 shows the identification by HPLC (A) and MS (C) and chiral identification of the product in enzymatic conversion of 2-oxo-4-phenylbutyric acid to synthesize L-homophenylalanine.

The same induction method as that in Example 2 was adopted, and the cells were collected. 5 mL of a catalytic reaction system containing 50 mM sodium phosphate buffer solution (pH 8.0), 20 g/L wet cells, 20 mM Compound (5), and 30 mM NADH was reacted at 30° C. A sample was taken and filtered through a 0.22 mol filter membrane. The same methods as those in Example 2 were used for detection. As shown in A in FIG. 4, the same peak as that of the standard appears, indicating the production of L-HPA (6). Anion mass spectrometry, as shown in C in FIG. 4, further proves the formation of L-HPA (6).

Subsequently, the chirality of the product was detected by a Waters Alliance e2695 HPLC system using a UV detector at 210 nm. The column was DAICEL CHIRALPAK AD-H (250×4.6 mm, 5 m), the flow rate was 1 mL/min, the column temperature was 25° C., and the mobile phase was n-hexane/ethanol=90/10 containing 0.1% TFA, and the running time was 10 min. As shown in B in FIG. 4, the peak of the product occurs at the same time as that of the standard L-homophenylalanine product, and ee of the product is >99%.

Example 5: Construction, Expression, and Screening of Strain Co-Expressing Four Enzymes The nucleotide sequence (as shown in SEQ ID NO.7) of a target protein coding gene in the genome of *Candida boidinii*, and SEQ ID NO.1, SEQ ID NO.3 and SEQ ID NO.5 in Examples 2, 3 and 4 were used as templates. PCR was performed using the primers shown in Table 1 to obtain a target gene. PpNahE and TiPheDH enzymatically cleaved with EcoRI and HindIII were ligated to pCDFDuet-1, pACYCDuet-1, pETDuet-1, and pRSFDuet-1 plasmid vectors enzymatically cleaved with the same enzymes by T4 ligase. The CbFDH and EcQOR were enzymatically cleaved with NdeI and XhoI and ligated by T4 ligase. 8 plasmids were obtained.

TABLE 1

Primer sequence

| Primer name | Sequence (5'-3') | No. |
|---|---|---|
| EcQOR-F-NdeI | GGAATTCCATATGGCAACACGAATTGAATTTC | SEQ ID NO. 11 |
| EcQOR-R-XhoI | CCGCTCGAGTTATGGAATCAGCAGGCTGG | SEQ ID NO. 12 |
| CbFDH-F-NdeI | GGAATTCCATATGAAGATTGTCTTAGTTCTTTATGS | SEQ ID NO. 13 |
| CbFDH-F-XhoI | CCGCTCGAGTTATTTCTTATCGTGTTTACCG | SEQ ID NO. 14 |
| TiPheDH-F-EcoRI | CGGAATTCGATGCGCGACGTGTTTGAAATGATGG | SEQ ID NO. 15 |
| TiPheDH-R-HindIII | CCCAAGCTTTTACCTCCTTGCGCTGTTGCGGG | SEQ ID NO. 16 |

TABLE 1-continued

Primer sequence

| Primer name | Sequence (5'-3') | No. |
|---|---|---|
| PpNahE-F-EcoRI | CGGAATTCGATGCTGAACAAAGTGATTAAAACC | SEQ ID NO. 17 |
| PpNahE-R-HindIII | CCCAAGCTTTTATTTGCTATATTTCGCATGC | SEQ ID NO. 18 |

Note: The underlined represents the restriction endonuclease cleavage site

TABLE 2

Strains co-expressing four-enzymes

| Strain name | Plasmids contained in the strain | Yield (g/L) | Conversion rate (%) |
|---|---|---|---|
| W1 | pACYC-PpNahE-EcQOR, pCDF-TipheDH-cbFDH | 0.18 | 5.0 |
| W2 | pACYC-PpNahE-EcQOR, pET-TipheDH-cbFDH | 0.44 | 12.4 |
| W3 | pACYC-PpNahE-EcQOR, pRSF-TipheDH-cbFDH | 1.25 | 35.0 |
| W4 | pET-PpNahE-EcQOR, pCDF-TipheDH-cbFDH | 0.22 | 6.1 |
| W5 | pET-PpNahE-EcQOR, PACYC-TipheDH-cbFDH | 0.33 | 9.2 |
| W6 | pET-PpNahE-EcQOR, pRSF-TipheDH-cbFDH | 0.83 | 23.2 |
| W7 | pRSF-PpNahE-EcQOR, pCDF-TipheDH-cbFDH | 0.20 | 5.5 |
| W8 | pRSF-PpNahE-EcQOR, pET-TipheDH-cbFDH | 0.15 | 4.3 |
| W9 | pRSF-PpNahE-EcQOR, PACYC-TipheDH-cbFDH | 0.12 | 3.5 |
| W10 | pCDF-PpNahE-EcQOR, pACYC-TipheDH-cbFDH | 1.47 | 41.0 |
| W11 | pCDF-PpNahE-EcQOR, pRSF-TipheDH-cbFDH | 1.8 | 51.5 |
| W12 | pCDF-PpNahE-EcQOR, pET-TipheDH-cbFDH | 0.08 | 2.3 |

Subsequently, the obtained 8 recombinant plasmids were transformation to BL21(DE3) by a double-resistant plate, to obtain genetically engineered strains W1-W12 (as shown in Table 2). The same induction method as that in Example 2 was adopted, and the cells were collected. Subsequently, the cells were screened in 5 mL of a screening system containing 50 mM sodium phosphate buffer solution (pH 8.0), 20 mM benzaldehyde, 20 mM pyruvic acid, 0.2 mM NAD$^+$, 50 mM ammonium formate and 20 g/L wet cells. As shown in Table 2, the strain W11 achieves a conversion rate of 51.5%, and is the optimum strain.

Example 6: Modification of Rate-Limiting Enzyme Phenylalanine Dehydrogenase TipheDH To further increase the production of L-HPA, the rate-limiting enzyme (TipheDH) in strain W11 was modified, by half-saturation mutations at sites C70 and T115 to obtain a dual-mutantTipheDH$^{C70A/T115E}$, then site-directed mutagenesis of two cysteine residues C256 and C282 on the surface of the protein, on the basis of the dual mutant to obtain a tetra-mutant TipheDH$^{C70A//T115E/C256A/C282L}$, and finally truncation of 6 amino acids at the C terminus on the basis of the tetra-mutant, to finally obtain the mutant r360TipheDH$^{C70A//T115E/C256A/C282L}$, having gene sequence information and an amino acid sequence as shown in SEQ ID NO. 9 and SEQ ID NO. 10. Compared to the wild type, the activity is increased by 0.82 times, and the expression level is increased by 2.54 times. By replacing the wild-type TipheDH in strain W11 by the mutant r360Tiphe DH$^{C70A//T115E/C256A/C282L}$, An optimum strain W13 was obtained, with which a conversion rate of 95.3% of achieved. The mutant was obtained by whole plasmid PCR, and the primers used were listed in Table 3.

The protein purification method adopted was as follows. The collected mutants were ultrasonically homogenized, and the obtained homogenate was centrifuged at a low temperature of 4° C. and a high speed of 8000 rpm for 30 min, to obtain a crude enzyme solution. After nickel affinity chromatography, a pure protein was obtained.

The enzyme activity detection method used was as follows. The activity of the phenylalanine dehydrogenase was evaluated by detecting the ultraviolet absorption at a wavelength of 340 nm on a microplate reader. The system includes 50 mM sodium phosphate buffer (pH 8.0), 10 mM (5), 1 mM NADH and 5 M TipheDH. One unit of enzyme activity is the amount of enzyme required to convert 1 M NADH in 1 minute.

TABLE 3

Primer sequence

| Primer name | Sequence (5'-3') | No. |
|---|---|---|
| C70X-F | CATGACCTATAAANBTAGTCTG | SEQ ID NO. 19 |
| C70X-R | CAGACTAVNTTTATAGGTCATG | SEQ ID NO. 20 |
| T115X-F | TCTATACCGGAGNNGACATG | SEQ ID NO. 21 |
| T115X-R | CATGTCNNCTCCGGTATAGA | SEQ ID NO. 22 |
| C256A-F | ATTGACGAGTTCCGTGCCCTGGC | SEQ ID NO. 23 |
| C256A-R | GCCAGGGCACGGAACTCGTCAAT | SEQ ID NO. 24 |
| C256V-F | ATTGACGAGTTCCGTGTCCTGGC | SEQ ID NO. 25 |
| C256V-R | GCCAGGACACGGAACTCGTCAAT | SEQ ID NO. 26 |
| C282L-F | CAAAAACGGAGCATTCTGTATGC | SEQ ID NO. 27 |

TABLE 3-continued

Primer sequence

| Primer name | Sequence (5'-3') | No. |
|---|---|---|
| C282L-R | GCATACAGAATGCTCCGTTTTG | SEQ ID NO. 28 |
| C282V-F | CAAAAACGGAGCATTGTGTATGC | SEQ ID NO. 29 |
| C282V-R | GCATACACAATGCTCCGTTTTG | SEQ ID NO. 30 |
| r360TipheDH-F | GGATCTTGTTGGAGGATCCCCTCGAGCACCACCACCACC | SEQ ID NO. 31 |
| r360 TipheDH-R | GGTGGTGGTGGTGCTCGAGGGGATCCTCCAACAAGATCC | SEQ ID NO. 32 |

Example 7: 5 L Scale Production

Figure 5:
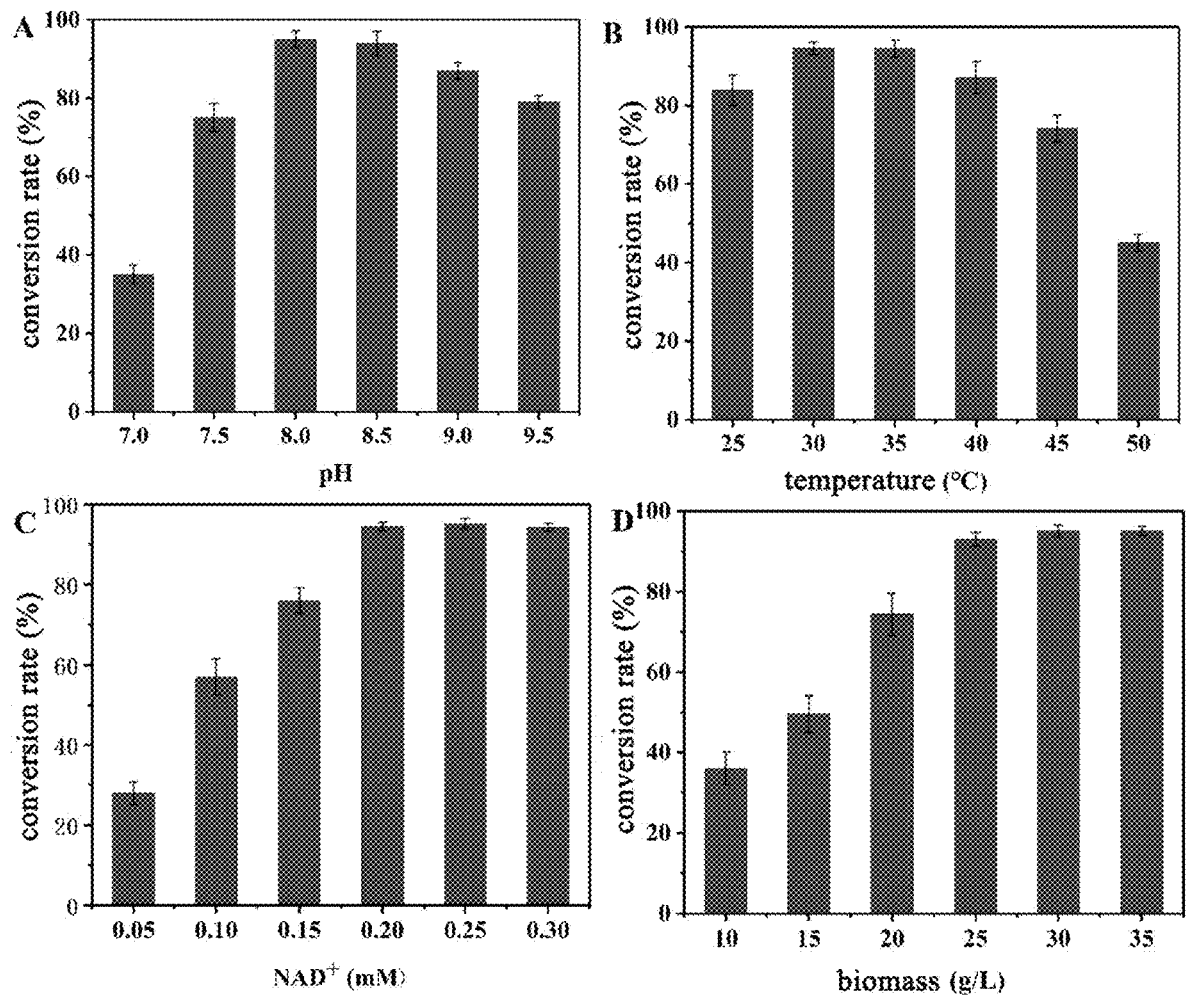
FIG. 5 shows the optimization of reaction conditions for W13 strain.

The reaction conditions for the production of L-HPA from benzaldehyde and pyruvic acid were optimized by the strain W13. As shown in FIG. 5. the optimal reaction conditions include pH 8.0, a temperature of 30° C., a cell concentration of 25 g/L, and co-enzyme $NAD^+$ at a concentration of 0.2 mM.

Figure 6:
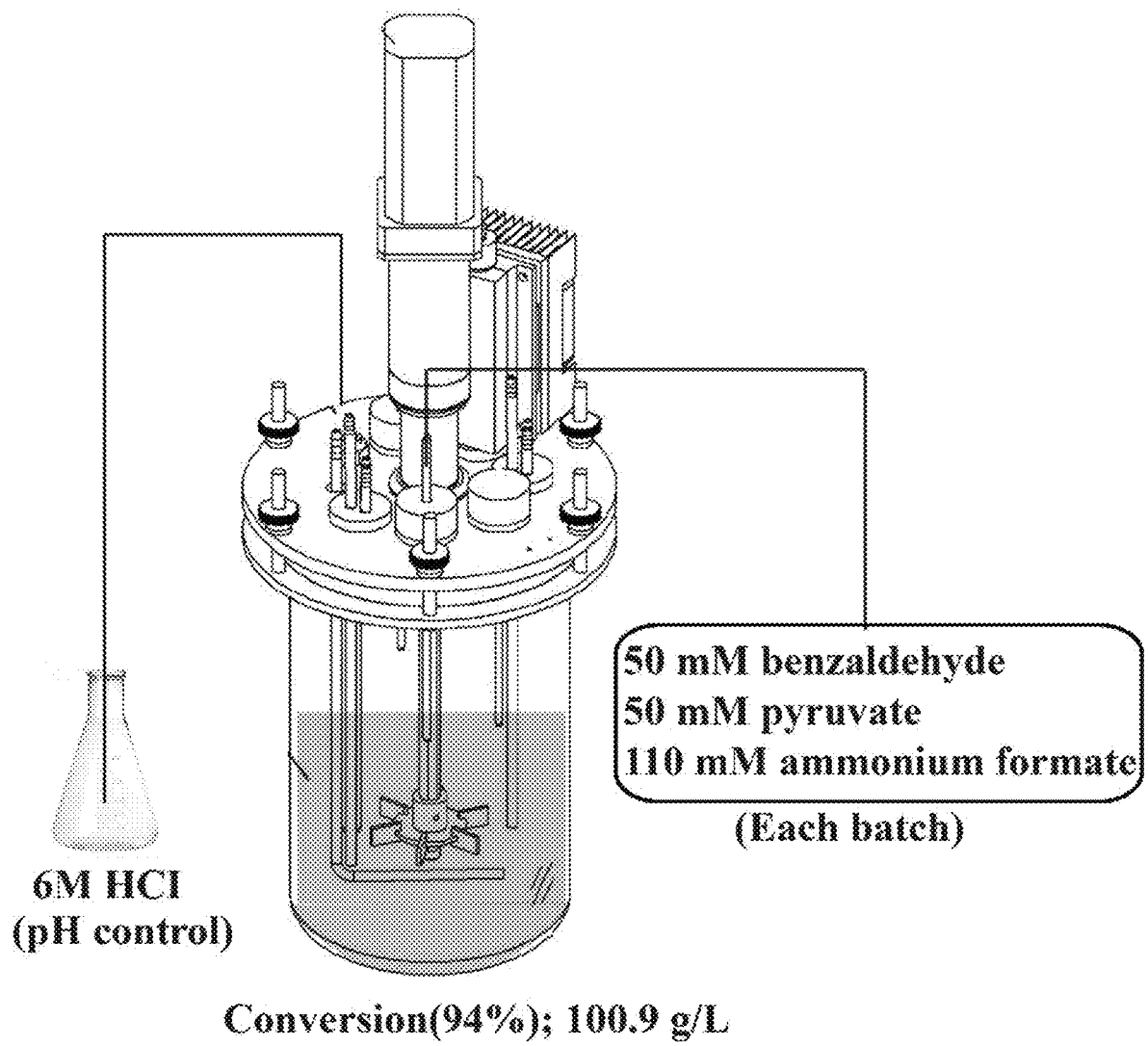
FIG. 6 shows the fed-batch production of L-HPA by W13 strain in a 5 L reactor.

Finally, the reaction was carried out in a 5 L fermentor. Under optimal reaction conditions, the W13 strain was fed in batches for catalysis. 50 mM benzaldehyde and pyruvic acid and 110 mM ammonium formate were added in each batch. A total of 12 batches of reaction were carried out. During the reaction, the pH was controlled at 8.0 with 6M HCl. As shown in FIG. 6. during the 12 batches of reaction, the yield is 100.9 g/L, and the conversion rate is 94%.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims.

What is claimed is:

1. A genetically engineered strain producing L-homophenylalanine, wherein the engineered strain co-expresses an aldolase, a quinone oxidoreductase, a phenylalanine dehydrogenase and a formate dehydrogenase,
wherein the aldolase has the amino acid sequence as shown in SEQ ID NO: 2; the quinone oxidoreductase has the amino acid sequence as shown in SEQ ID NO: 4; the phenylalanine dehydrogenase has the amino acid sequence as shown in SEQ ID NO.6 or SEQ ID NO: 10; and the formate dehydrogenase has the amino acid sequence as shown in SEQ ID NO: 8.

2. The genetically engineered strain according to claim 1, wherein the engineered strain is produced with *E. coli* as a host.

3. The genetically engineered strain according to claim 2, wherein the *E. coli* is *Escherichia coli* BL21 (DE3).

4. The genetically engineered strain according to claim 1, wherein the aldolase and the quinone oxidoreductase are expressed with pCDFDuet-1 as a vector, and the phenylalanine dehydrogenase and the formate dehydrogenase are expressed with pRSFDuet-1 as a vector.

5. A method of producing L-homophenylalanine, comprising: using the genetically engineered strain according to claim 1 to produce the L-homophenylalanine.

6. The method according to claim 5, comprising: catalytically synthesizing L-homophenylalanine with benzaldehyde and pyruvic acid using the genetically engineered strain as a catalyst, wherein the amount of the genetically engineered strain is 20-30 g/L; the content of the coenzyme $NAD^+$ is 0.1-0.3 mM; the pH of the reaction system is 7.5-8.5; the reaction temperature is 28-32° C.; during the reaction, the substrates benzaldehyde and pyruvic acid are fed in batches, and the substrates are fed in an amount of 40-60 mM benzaldehyde and 40-60 mM pyruvic acid in each batch; and during the reaction, ammonium formate is also fed in batches, in an amount of 90-130 mM in each batch.

* * * * *